(12) United States Patent
Seiler et al.

(10) Patent No.: US 9,075,968 B2
(45) Date of Patent: Jul. 7, 2015

(54) DYNAMIC CREATION OF A TEMPORARY ADMINISTRATIVE USER

(75) Inventors: Christopher J. Seiler, Mapleton, UT (US); Kurt Nosack, Payson, UT (US); Michael A. Gord, Orem, UT (US)

(73) Assignee: NOVELL, INC., Provo, UT (US)

( * ) Notice: Subject to any disclaimer, the term of this patent is extended or adjusted under 35 U.S.C. 154(b) by 2209 days.

(21) Appl. No.: 11/452,016

(22) Filed: Jun. 13, 2006

(65) Prior Publication Data
US 2007/0288990 A1 Dec. 13, 2007

(51) Int. Cl.
*G06F 21/60* (2013.01)
*G06F 21/30* (2013.01)
*G06F 9/445* (2006.01)

(52) U.S. Cl.
CPC .............. *G06F 21/305* (2013.01); *G06F 8/61* (2013.01); *G06F 2221/2141* (2013.01)

(58) Field of Classification Search
CPC .................. G06F 21/604; G06F 2221/2141
USPC .......... 713/201, 153; 707/104.1, 10; 726/2–8; 709/217–220, 226–228
See application file for complete search history.

(56) References Cited

U.S. PATENT DOCUMENTS

| 6,324,690 | B1 | 11/2001 | Luu |
| 2003/0126592 | A1 | 7/2003 | Mishra et al. |
| 2003/0149892 | A1 | 8/2003 | Robinson |
| 2006/0053417 | A1* | 3/2006 | Henderson et al. ........... 717/168 |
| 2006/0167940 | A1* | 7/2006 | Colton et al. ............... 707/104.1 |
| 2007/0106984 | A1* | 5/2007 | Birk Olsen et al. ........... 717/174 |
| 2007/0226225 | A1* | 9/2007 | Yiu et al. ........................ 707/10 |

FOREIGN PATENT DOCUMENTS

EP 0 950 942 10/1999

OTHER PUBLICATIONS

Novell, Inc., "ZENworks 7 Suite," www.novell.com/products/zenworks/overview7.html, printed Jun. 13, 2006, 17 pps.

* cited by examiner

*Primary Examiner* — Josnel Jeudy
(74) *Attorney, Agent, or Firm* — King & Schickli PLLC

(57) ABSTRACT

In a computing system environment for administratively installing MSI applications on one or more computing devices of a remote user, methods and apparatus include creating a temporary administrative user on the computing devices. Upon installation, the temporary administrative user is removed and the application is used normally. Preceding installation, however, determinations are made regarding whether the MSI application requires the presence of the user. If so, creation of the temporary administrative user occurs on the fly by software, indicated by way of an administrator of the environment on a computing device other than the one being installed with the application. In this manner, MSI applications, which oftentimes require the presence of an actual user, can be successfully installed without their presence. They can also be installed without the security risks of a generic user common to all computing device or installed immediately without waiting for a first user to log on.

14 Claims, 4 Drawing Sheets

DYNAMIC CREATION OF A TEMPORARY ADMINISTRATIVE USER

FIELD OF THE INVENTION

Generally, the present invention relates to computing system environments having administrative users. Particularly, it relates to creating administrative users and dissolving them upon satisfactory completion of various tasks. Temporary or transitory administrative users are useful especially in the context of installing certain applications, such as MSI applications, per a user's computing device.

BACKGROUND OF THE INVENTION

For some time it has been known to utilize administrative users to configure and maintain complex computing system environments. For example, Novell Inc.'s ZENworks Desktop Management enables administrators to automatically and transparently configure, update and troubleshoot computing devices from anywhere in the environment—inside or outside the firewall—without having to physically or electronically visit each device. Using policies, administrators generate and maintain environments with content and applications that are tailored to personal needs of each user or group of users. As a result, users access their work environment and applications in simple, consistent ways from any computing device, at any location.

However, installation of certain applications, such as various Microsoft Software Installer (MSI) applications, requires users to be logged into the environment. Since installations or other maintenance is often performed by administrators at off hours, such as overnight, no guarantees exist that users will be logged on at the appropriate time. To overcome this, some have tried installations with a System User or by adding a common user or common account per each computing device in the environment. With the former, many MSI applications will still not install. With the latter, security is potentially compromised for want of accountability per the common user or account. In still other environments, installation has been attempted after a first user logs on. This, unfortunately, de-prioritizes the user in favor of the administrator and forces them to wait for completion of the administrator's tasks.

Accordingly, there are needs in the art for simple, yet effective ways of installing applications that require the presence of users. The need extends to installing applications without requiring users to be actually logged on, without de-prioritizing users or having common accounts. Naturally, any improvements should further contemplate good engineering practices, such as relative inexpensiveness, stability, ease of implementation, low complexity, etc.

SUMMARY OF THE INVENTION

The above-mentioned and other problems become solved by applying the principles and teachings associated with the hereinafter described dynamic creation of a temporary administrative user. In one aspect, a computing system environment includes an administrator, a user and one or more computing devices per each of the administrator and the user. Upon determination that the temporary administrative user is needed, the regular administrator indicates the desirability of creating it and such is done for a variety of reasons. Representatively, the administrator indicates a preference during an administrative action, such as installing an MSI application, and software creates the temporary administrative user on the computing device(s) of the user in time for the actual installation of the MSI application on the computing device(s). Upon successful installation, the temporary administrative user is dissolved, or removed, and the application is used normally by the user.

In this regard, determinations are made regarding whether the MSI application requires the presence of the user at the computing device being installed. If so, creation of the temporary administrative user occurs on the fly by software, indicated via the administrator on a computing device other than the one being installed with the application. In this manner, MSI applications, which oftentimes require the presence of an actual user, can be successfully installed without the presence of the actual user. They can also be installed without the security risks of a generic user common to all computing devices or installed fairly immediately without waiting for a first user to log on.

Computer readable medium for installation in the environment contemplates enabling or associating rights of the administrator to create the temporary administrative user, performing the actual creating and removing of the temporary administrative user, and the performing of an action by the temporary administrative user. Representatively, an action for the temporary administrative user is the installation of the MSI application. Install boxes for administrators are also contemplated, including options to indicate a preference, or not, to use the temporary administrative user.

As it relates to timing, the temporariness of the administrative user representatively lasts a period of time to install an MSI application, report the installation and then leave. Of course, other temporal scenarios are possible for this or other actions.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, a dynamically created temporary administrative user, for accomplishing various tasks, is hereinafter described.

Figure 1:
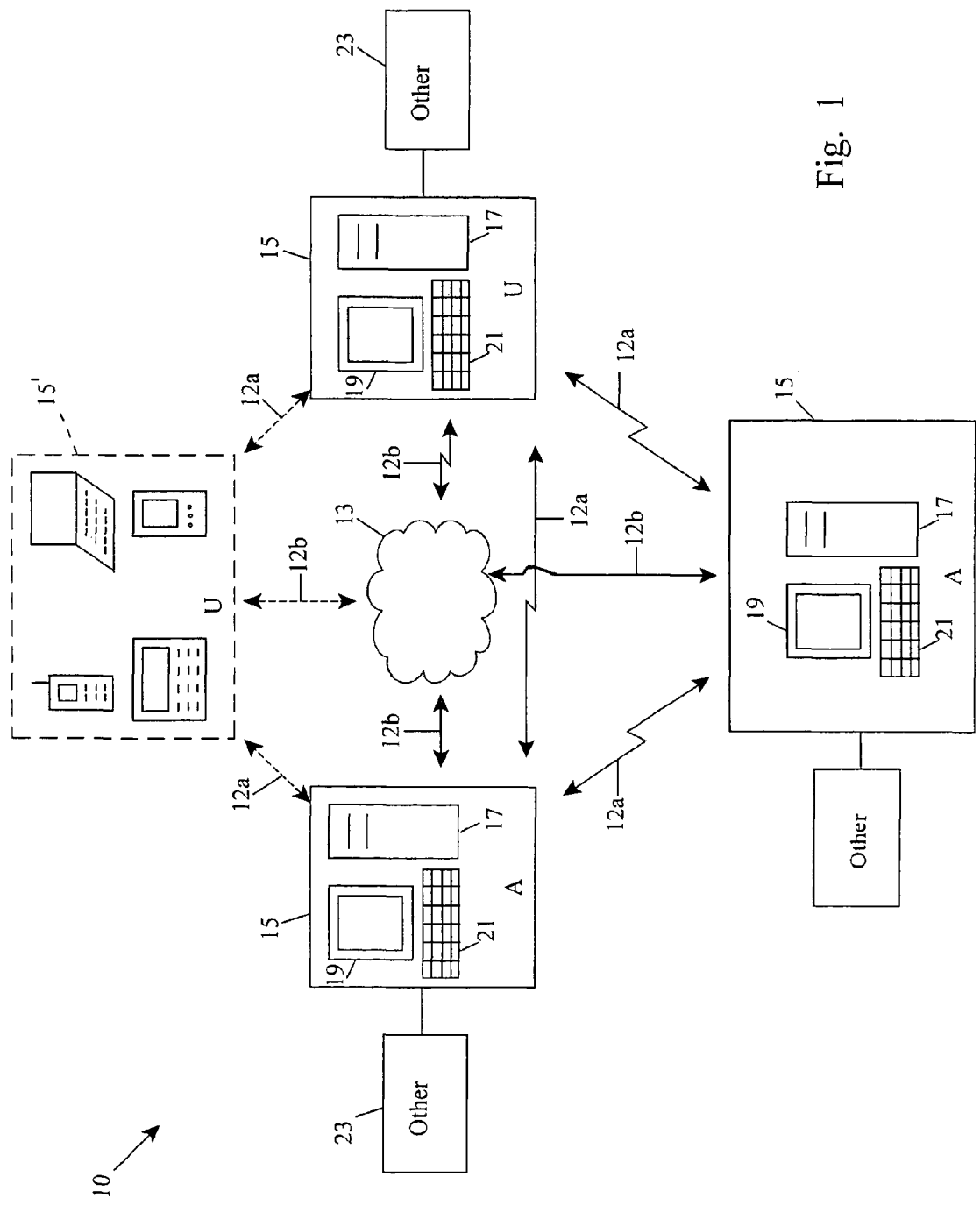
FIG. 1 is a diagrammatic view in accordance with the present invention of a representative computing system environment for dynamically creating a temporary administrative user.

With reference to FIG. 1, a representative environment 10 for dynamically creating a temporary administrative user includes one or more computing devices 15 available per each of an administrator A and user U. In a traditional sense, an exemplary computing device includes a general or special purpose computing device in the form of a conventional fixed or mobile computer 17 having an attendant monitor 19 and user interface 21. The computer internally includes a processing unit for a resident operating system (suitable operating systems include those, such as DOS, WINDOWS, and MACINTOSH, to name a few), a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers or the like. The other items may also be stand alone computing devices 15' in the environment 10.

In either, storage devices are contemplated and maybe remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer readable media. Computer executable instructions may also reside in hardware, firmware or combinations in any or all of the depicted devices 15 or 15'.

When described in the context of computer readable media, it is denoted that items thereof, such as modules, routines, programs, objects, components, data structures, etc., perform particular tasks or implement particular abstract data types within various structures of the computing system which cause a certain function or group of functions. In form, the computer readable media can be any available media, such as RAM, ROM, EEPROM, CD-ROM, DVD, or other optical disk storage devices, magnetic disk storage devices, floppy disks, or any other medium which can be used to store the desired executable instructions or data fields and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation.

Figure 2:
FIG. 2 is a screen shot in accordance with the present invention for use by an administrator in dynamically creating a temporary administrative user on a computing device of a user.

With reference to FIG. 2, a representative screen shot for display on a monitor of a computing device of the administrator in the computing system environment appears generically as 40. It includes an install box 42 with a variety of administrator options. In the first option 44, an administrator types or enters the name of the application to be installed on a computing device of one or more computing devices of a user. In this case, the application is an MSI application by the name of Orca.msi. In the second option 46, parameters of the application can be entered by the administrator. Representatively, this includes things like specifying an install directory. In the third option 48, the administrator enters how the preceding MSI application is to be installed on the one or more computing devices of the user.

That is, if the administrator knew that a user was logged on to the computing device, the administrator might select the drop down menu 50 and highlight the word "USER." Alternatively, the administrator might highlight the word "SYSTEM," thereby indicating installation via a System user. These types of installations, however, have had shortcomings. Thus, an expedient installation of the application includes highlighting the "DAU" option as the RUN AS format. Representatively, DAU stands for Dynamic Administrative User. In turn, this selection first installs an administrative user on the computing device that is to receive installation of the application. Second, it installs the MSI application listed in option 44. Third, it removes the administrative user from the computing device upon successful installation. In other words, the DAU is a fleeting or temporary administrative user that assists in the installation of applications, particularly MSI applications.

As a result, certain advantages of the invention over the prior art are readily apparent. For example, selection of the DAU creates a temporary administrative user on the fly and is done by software indicated by way of the administrator on a computing device other than the one being installed with the application. In this manner, MSI applications, which oftentimes require the presence of an actual user, can be successfully installed without the presence of an actual user. They can also be installed without the security risks of a generic user common to all computing devices or installed fairly immediately without waiting for a first user to log on.

Figure 3:
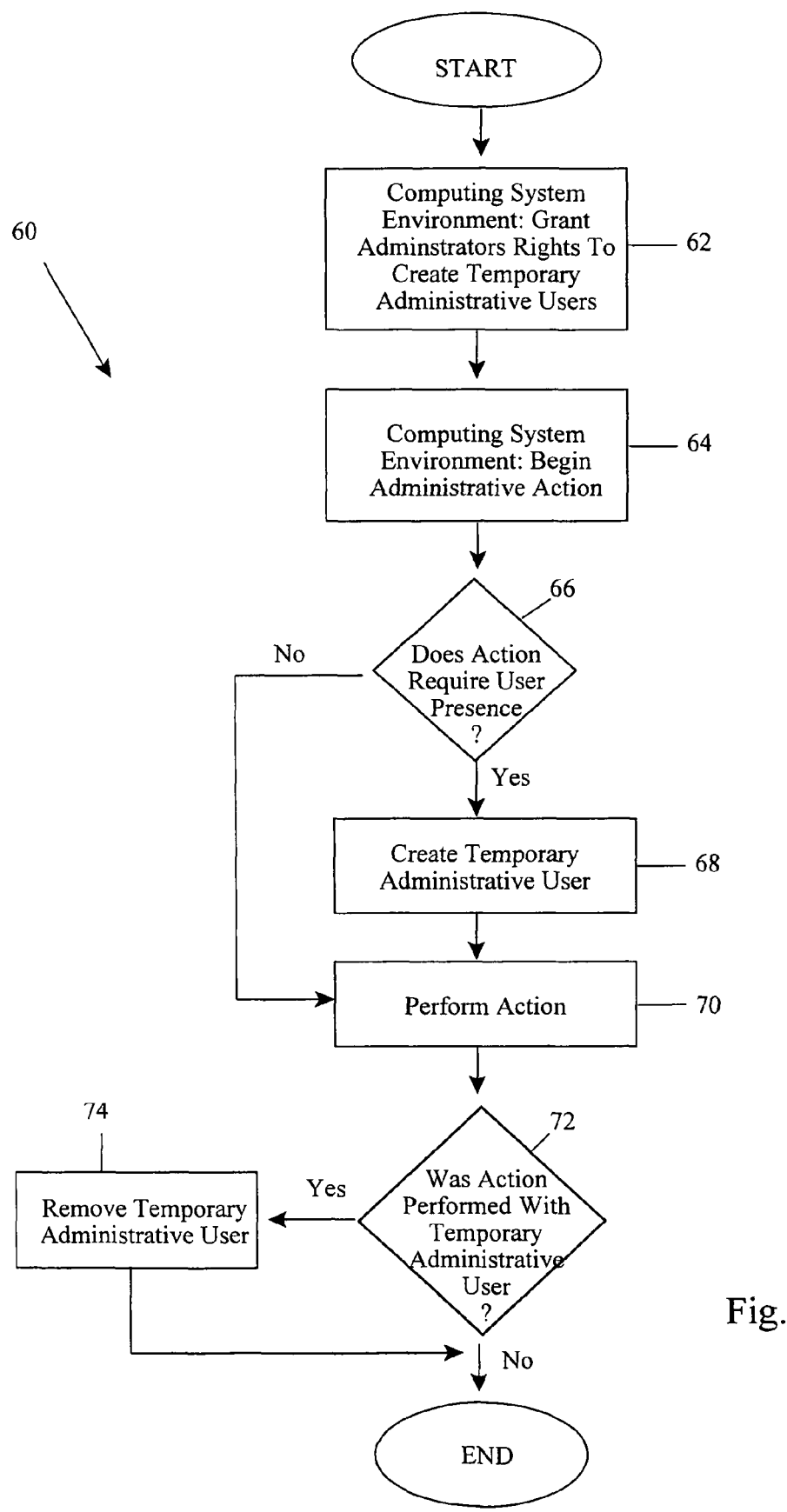
FIG. 3 is a flow chart in accordance with the present invention for performing an administrative action, such as installing an MSI application, by way of a temporary administrative user.

With reference to FIG. 3, a systematic flow of the invention is given as 60. At step 62, it is appropriate to grant or cause the granting of a larger set of rights to the administrative users who will eventually create a temporary administrative user. Thus, administrators of the computing system environment are bestowed initially with the rights to create other administrative users, especially temporary administrative users. In function, this can be accomplished by variously assigning rights to administrators as part of the installation of the software or computer executable instructions that enable installation of MSI applications in the first place. Representatively, Novell Inc.'s ZENworks application is one such software program(s) whereby administrators can install MSI applications on computing devices of users and do so from computing devices other than the ones being installed. ZENworks is also known in the industry as an automated, intelligent way to manage complex platforms and systems by automatically applying and enforcing business policies on plural and varied computing devices. A portion of the appearance of ZENworks is also representatively seen in FIG. 2 in the background behind the install box 42.

Appreciating ZENworks is a representative context for the instant invention, the usefulness of a temporary administrative user may range beyond that of simply installing applications, such as MSI applications. For at least this reason, step 64 broadly recites that an administrative action, of sorts, begins in the computing system environment. Examples of administrative action other than installing MSI applications include, but are not limited to, installing applications other than MSI applications, creating a user on a local computing device so that functions higher than that of an ordinary user can be utilized, installing RPMs, running install scripts or batch files, or copying files and such may be Linux-based or other.

At step 66, it is determined whether the administrative action requires the presence of a user at the computing device that is the target of the administrative action. If so, the temporary administrative user (the DAU being one example) is created at step 68. If not, or after the result of creating the temporary administrative user, the administrative action is performed at step 70. As before, this performance of the administrative action might entail the installation of an MSI application. Also, skilled artisans will appreciate that not all MSI applications require the presence of a user at the computing device being installed with the application. Thus, step 66 may be avoided altogether. Namely, the creation of the temporary administrative user might occur as a matter of course for all or certain administrative actions. What is desired to be avoided, and needs to be balanced before undertaking this step or avoiding this step, is that a step of determining should not outweigh or take longer than the act of simply creating the temporary administrative users in all instances of installation.

Thereafter, if the action performed is determined to have been done with the temporary administrative user, step 72, the temporary administrative user is removed, step 74. Otherwise, the process 60 is completed.

Figure 4:
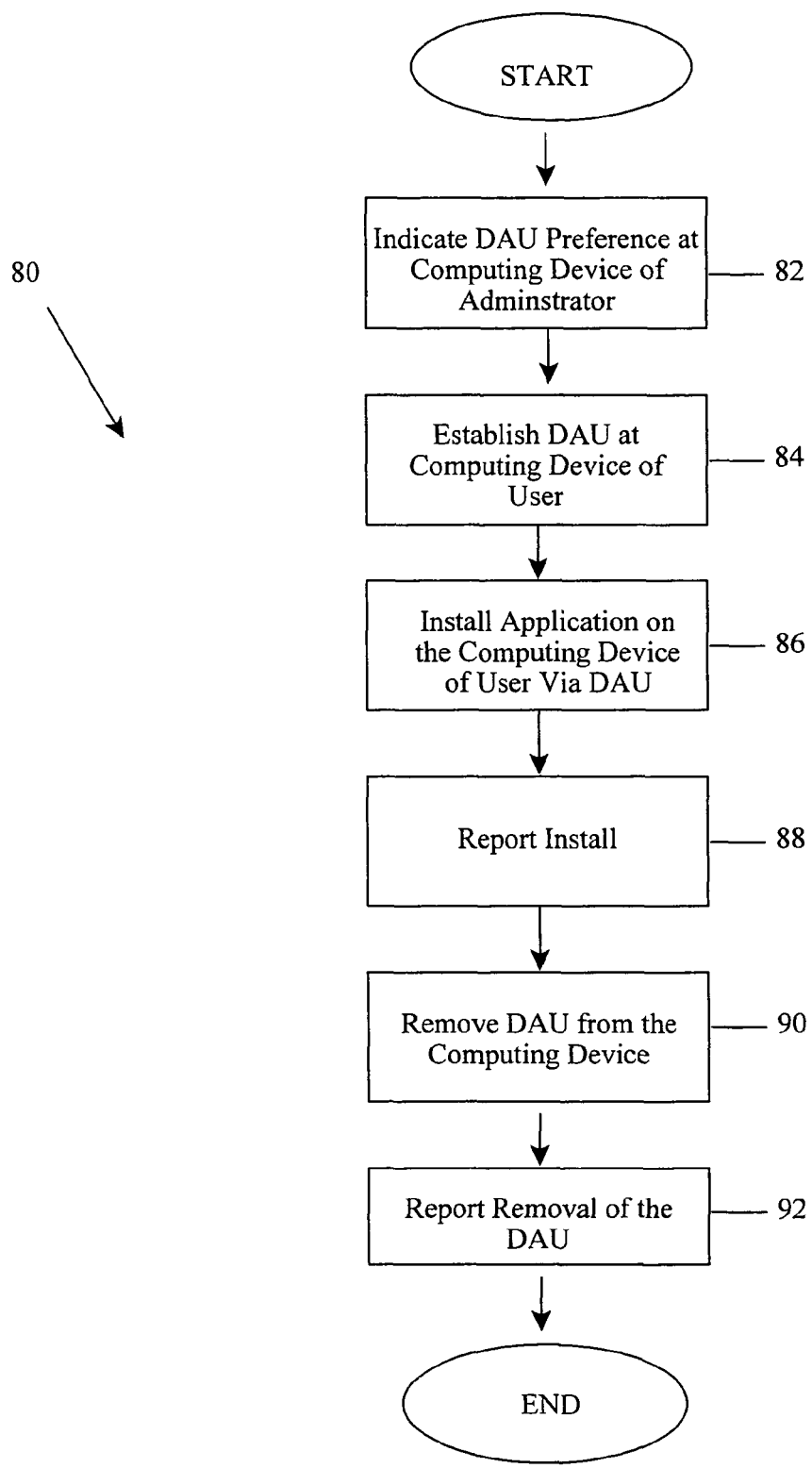
FIG. 4 is a flow chart in accordance with the present invention for representatively creating the temporary administrative user.

With reference to FIG. 4, the particular process for a temporary administrative user, in the form of a DAU, for taking administrative action, in the form of an application installation, is given generally as 80. At 82, an administrator indicates their preference for a DAU. This is done at one or more computing devices available to the administrator. At 84, the DAU is then created at the computing device of the user where the ultimate application is to be installed. In a representative embodiment, the act of creation is simply a server communicating with the computing device of the user (either the server "pushing" to the client or the client "pulling" from the server, or an interactive exchange between the two) and the administrator for the purposes of establishing another user.

At 86, the application is installed on the computing device of the user having the DAU. Unlike instances where a user needs to be present to install an application, the application itself recognizes the presence of the temporary administrative user and the higher functions available thereto. In this manner, as the application, such as the MSI application, goes through installation into the memory of the computing device, the DAU attends to various matters for installation. One example is the DAU establishes given settings in the application.

At 88, installation of the application is reported from the computing device of the user, such as to a server coordinating the installation or to the computing device of the administrator. At this time, the application is installed and the DAU can be successfully removed, step 90. Naturally, various dialog boxes may be opened to report the communication visually to an administrator via the monitor of their computing device. Lastly, step 92 is provided so that reporting of the removal of the DAU can be observed. In this manner, the entire installation process is complete. Alternatively, the steps of reporting may be foregone in favor of simply indicating a successful installation.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment utilizing an administrator, a user and one or more computing devices per each of the administrator and the user, a method for installing an Microsoft Software Installer (MSI) application on one of the one or more computing devices of the user, comprising:
by the administrator on one of the one or more computing devices of the administrator, creating a temporary administrative user on a target one of the one or more computing devices of the user; and
by way of the created temporary administrative user, installing the MSI application on the target one without requiring any security information be present with the temporary administrative user;
deleting the temporary administrative user immediately after installing the MSI application.

2. The method of claim 1, determining whether the MSI application requires a presence of the user on the one of the one or more computing devices of the user.

3. The method of claim 1, further including granting the administrator rights to create a temporary administrative user.

4. The method of claim 1, further including indicating a preference by the administrator of establishing the temporary administrative user before the creating.

5. In a computing system environment utilizing an administrator, a user and one or more computing devices per each of the administrator and the user, a method for installing an Microsoft Software Installer (MSI) application on a target one of the one or more computing devices of the user, comprising:
granting the administrator rights to create a temporary administrative user;
determining whether installing the MSI application requires a presence of the user on the one of the one or more computing devices of the user;
by the administrator on one of the one or more computing devices of the administrator, indicating a preference of creating the temporary administrative user;
if the installing requires the presence of the user, but the user is otherwise unavailable at the target one or not logged in, by the administrator on the one of the one or more computing devices of the administrator, creating a temporary administrative user on the one of the one or more computing devices of the user; and
removing the temporary administrative user from the one or more computing devices of the user immediately after the installing.

6. The method of claim 5, further including reporting the removing the temporary administrative user.

7. The method of claim 5, wherein the indicating the preference of creating the temporary administrative user further includes selecting an administrative user option along with various install parameters of the MSI application.

8. A computing system environment, comprising:
one or more computing devices available to an administrator;
one or more target computing devices available to a user; and
a plurality of computer executable instructions on the one or more computing devices available to the administrator for remotely installing a variety of applications on the one or more target computing devices available to the user, wherein the computer executable instructions for installing a Microsoft Software Installer (MSI) application include creating a temporary administrative user on the one or more target computing devices available to the user at a time when the installing requires the presence of the user, but the user is otherwise unavailable at the target or not logged in;
further wherein the plurality of computer executable instructions include deleting the temporary administrative user from the one or more target computing devices immediately after the installing the MSI application.

9. The environment of claim 8, further including computer executable instructions for making an install box appear on the one or more computing devices available to the administrator, the install box including an option for creating the temporary administrative user.

10. The environment of claim 9, wherein the install box further includes a parameter option for the MSI application.

11. The environment of claim 8, further including computer executable instructions granting administrative rights to an administrator for creating the temporary administrative user, the temporary administrative user having additional administrative rights for installing the MSI application.

12. A non-transitory computer readable medium having computer executable instructions for performing steps comprising:
receiving an indication from an administrator on one or more computing devices available to the administrator regarding a preference to create a temporary administrative user on one or more computing devices available to a user;
creating the temporary administrative user on the one or more computing devices available to the user;
installing a Microsoft Software Installer (MSI) application on the one or more computing devices available to the user by way of rights granted to the temporary administrative user; and
removing the temporary administrative user from the one or more computing devices immediately after the installing.

13. The computer readable medium of claim 12, further including providing an install box to the administrator on the one or more computing devices available to the administrator for the receiving the indication regarding the preference.

14. The computer readable medium of claim 12, further including granting rights to the administrator for the creating.

* * * * *